(No Model.) 4 Sheets—Sheet 1.
H. FLAD.
SYSTEM OF SUPPORTING AND REPAIRING ELECTRIC CONDUCTING WIRES, &c.
No. 361,217. Patented Apr. 12, 1887.
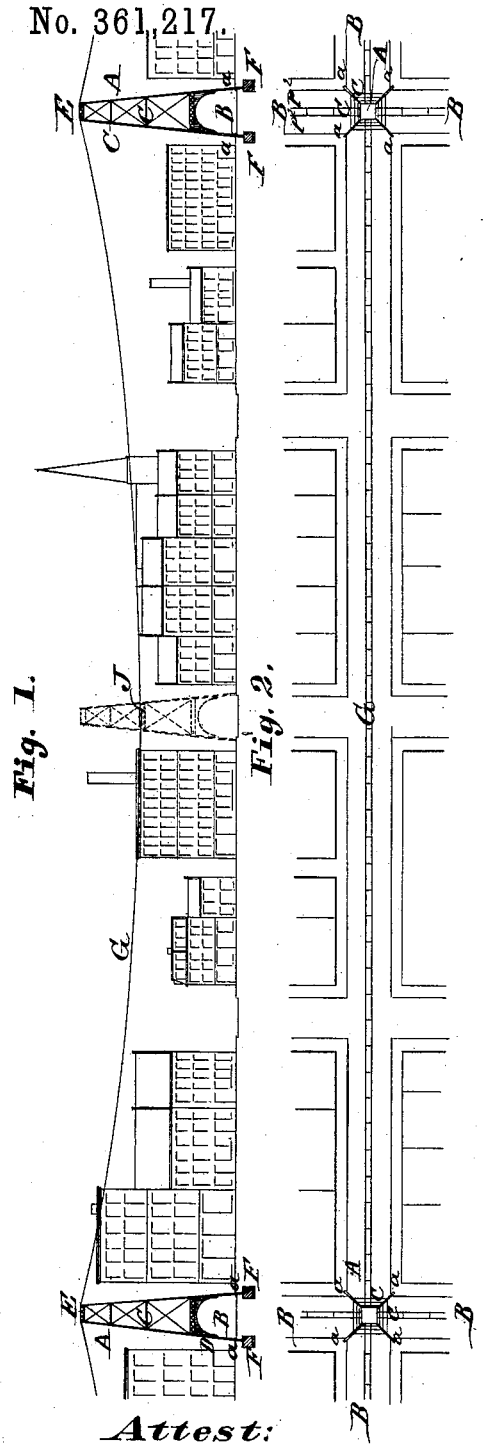
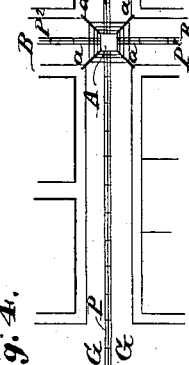
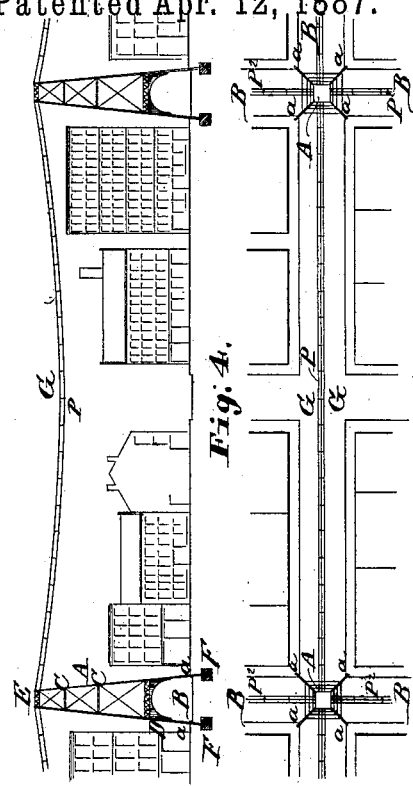
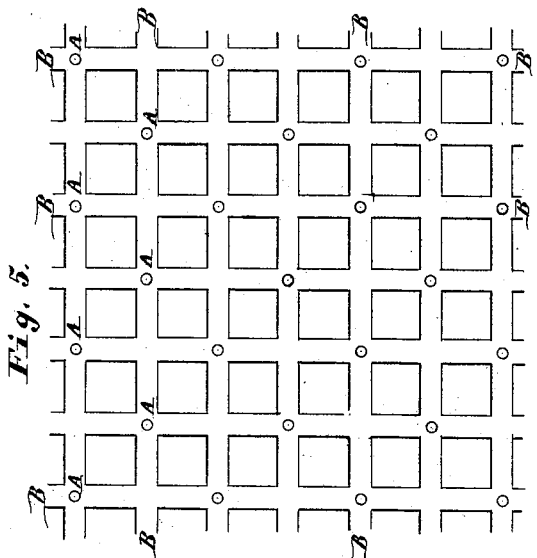
Attest:
F. A. Hopkins
Geo. L. Wheelock
Inventor:
Henry Flad
By Knight Bro.
Attys.

(No Model.) 4 Sheets—Sheet 2.
H. FLAD.
SYSTEM OF SUPPORTING AND REPAIRING ELECTRIC CONDUCTING WIRES, &c.
No. 361,217. Patented Apr. 12. 1887.
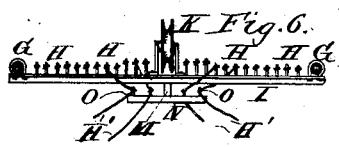
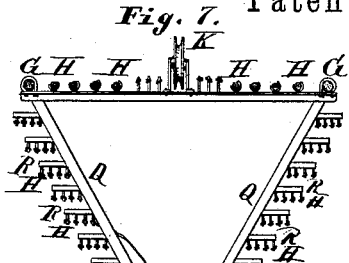
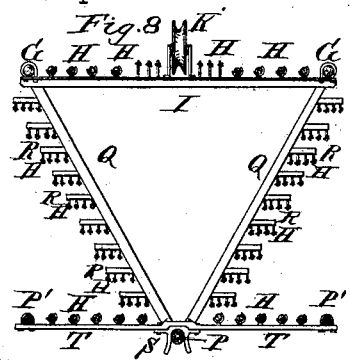
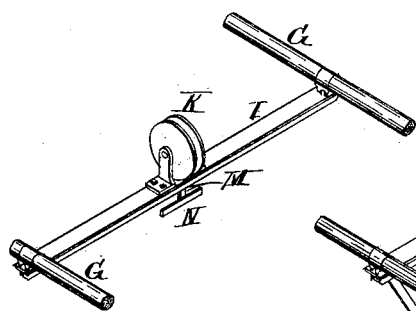
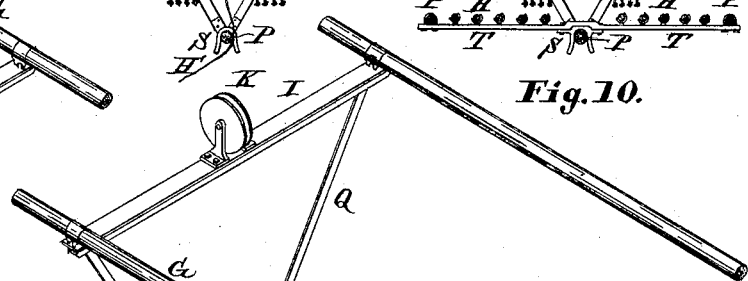
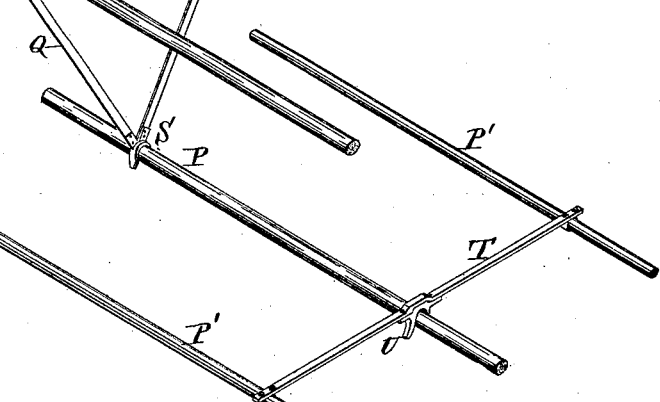
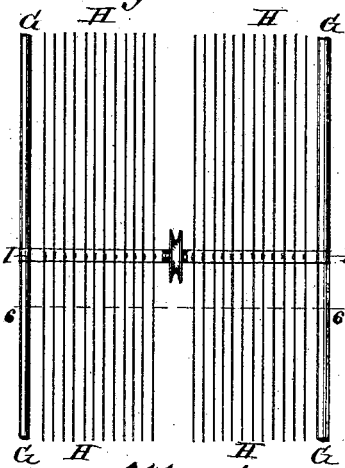
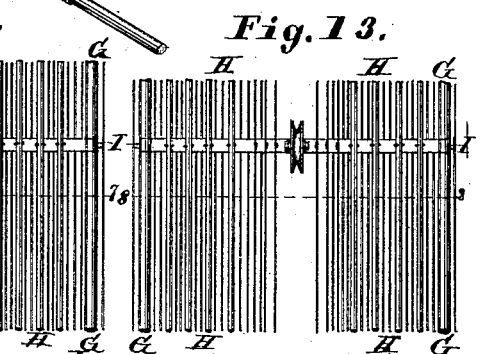
Attest:
F. A. Hopkins
Geo. L. Wheelock
Inventor:
Henry Flad
By Knight Bros.
Attys.
N. PETERS, Photo-Lithographer, Washington, D. C.

(No Model.) 4 Sheets—Sheet 3.
H. FLAD.
SYSTEM OF SUPPORTING AND REPAIRING ELECTRIC CONDUCTING WIRES, &c.
No. 361,217. Patented Apr. 12, 1887.
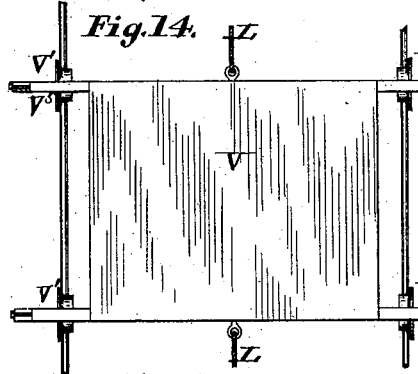
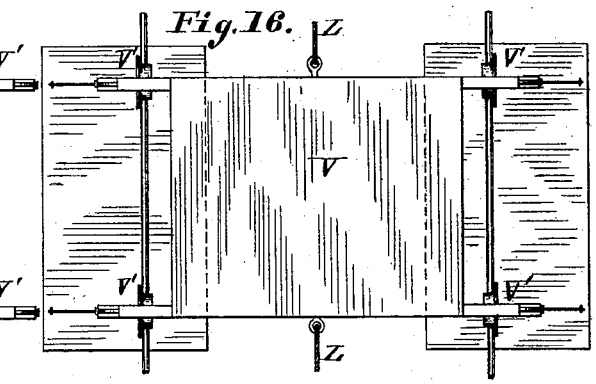
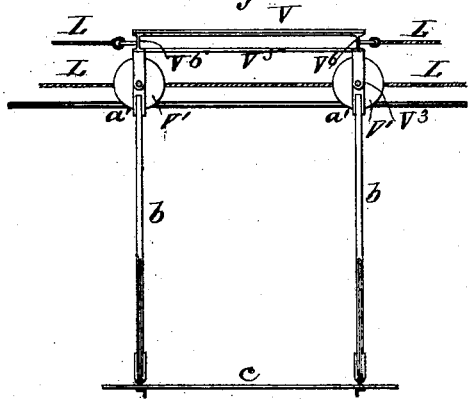
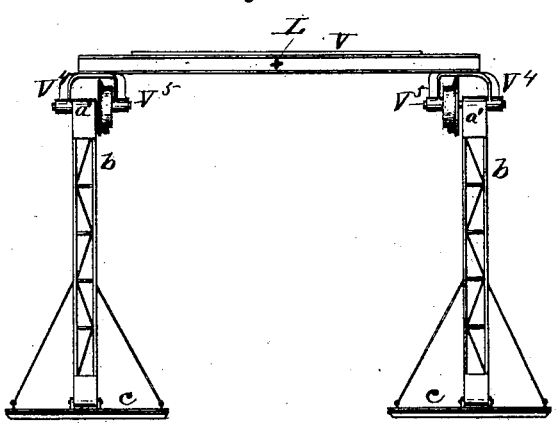
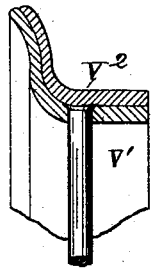
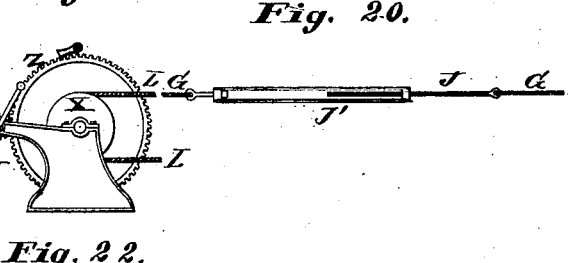
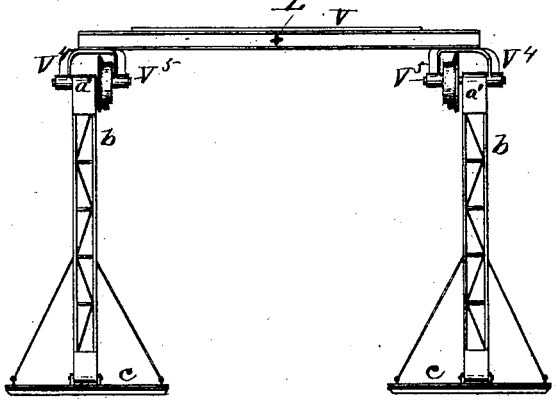
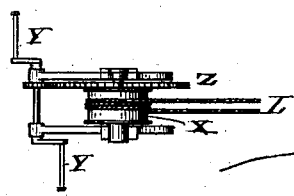
Attest:
F. A. Hopkins
Geo. L. Wheelock
Inventor:
Henry Flad.
By Knight Bro.
Attys.

(No Model.)  4 Sheets—Sheet 4.
H. FLAD.
SYSTEM OF SUPPORTING AND REPAIRING ELECTRIC CONDUCTING WIRES, &c.
No. 361,217.  Patented Apr. 12, 1887.
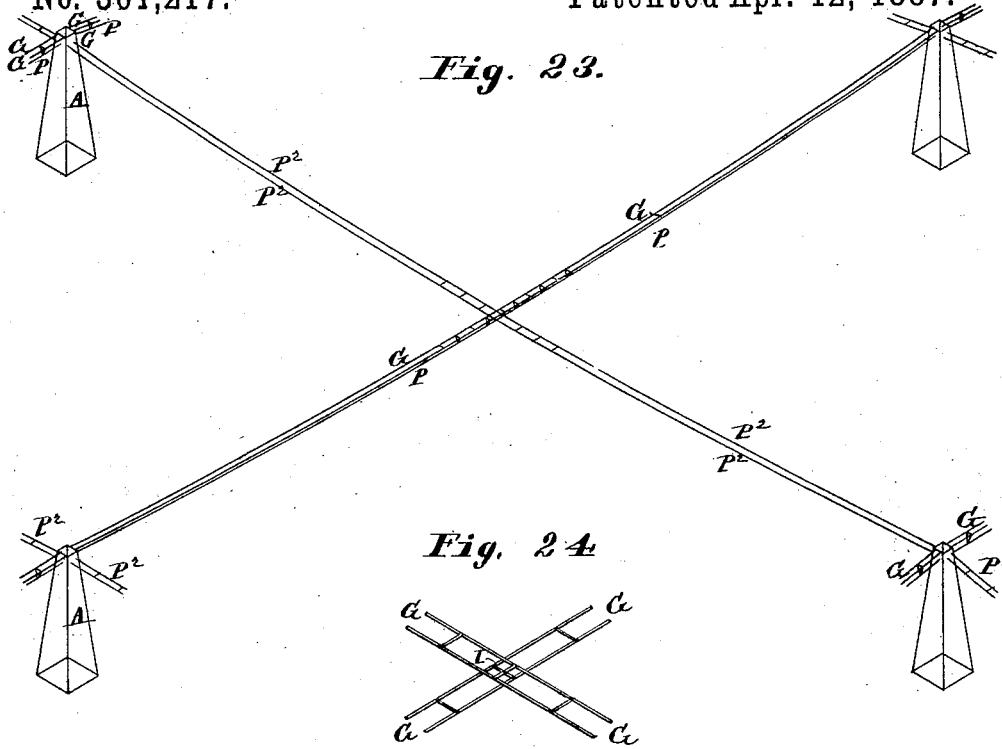
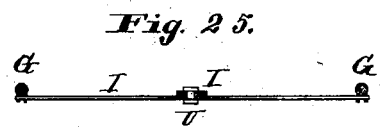
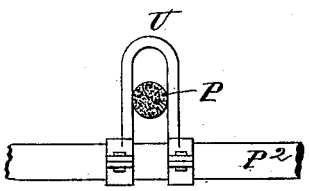
Attest:
F. A. S. Hopkins
Geo. L. Wheelock
Inventor:
Henry Flad
By Knight Bro.
Attys.

UNITED STATES PATENT OFFICE.

HENRY FLAD, OF ST. LOUIS, MISSOURI.

SYSTEM OF SUPPORTING AND REPAIRING ELECTRIC CONDUCTING-WIRES, &c.

SPECIFICATION forming part of Letters Patent No. 361,217, dated April 12, 1887.

Application filed February 16, 1886. Serial No. 192,139. (No model.)

*To all whom it may concern:*

Be it known that I, HENRY FLAD, of the city of St. Louis, in the State of Missouri, have invented a certain new and useful System of Laying, Supporting, and Repairing Electric Conducting Wires and Cables, of which the following is a full, clear, and exact description, reference being had to the accompanying drawings, forming part of this specification.

The system consists in supporting the electric wires and cables, at short distances apart, on cross-beams, frames, and brackets, which are fastened to two or more suspension-cables of sufficient strength to carry the load arising from the cross-beams, cables, brackets, wires, and other fixtures, and also of the car which is used in laying, repairing, and removing the supported cables and wires. Such suspension-cables are to be attached to towers, which are preferably of such height that the lowest parts of the cables are above the highest windows of the houses along the line, and so located in a plane passing through the center of the street as to prevent them from being interfered with by occupants of the houses and to secure them from injury by fires. The towers are preferably erected at the intersections of streets, or at such other points as are best adapted for the efficiency of arc-lights, in case such lights are to be used for lighting the streets.

The whole system of towers and suspension-cables should be devised with a view to the ultimate requirements of the city for electric appliances of all kinds, yet so arranged that its capacity can be gradually increased without throwing away any portion of the plant originally erected, and extended to new districts without loss of the plant of wires and cables now owned by the companies. Cars to carry workmen engaged in laying or repairing run upon the suspension-cables between the towers.

Figure 1 is an elevation, and Fig. 2 is a plan, of a line of the fourth class. Fig. 3 is an elevation, and Fig. 4 a plan, of a line of the first class. Fig. 5 is a plan illustrating the general arrangement of the towers. Fig. 6 is a transverse section at 6 6, Fig. 11. Fig. 7 is a transverse section at 7 7, Fig. 12. Fig. 8 is a transverse section at 8 8, Fig. 13. Fig. 9 is an isometric view of a cross-bar of a third or fourth class line. Fig. 10 is an isometric view of a cross-bar, &c., of a first-class line. Fig. 11 is a plan showing part of a fourth-class line. Fig. 12 is a plan showing part of a second-class line. Fig. 13 is a plan showing part of a first-class line. Fig. 14 is a plan of a car for the third or fourth class lines, and Fig. 15 is an elevation of the same. Fig. 16 is a plan of a car for a first or second class line. Fig. 17 is a front elevation, and Fig. 18 a side elevation, of this car. Fig. 19 is an enlarged section of one of the car-wheels, showing insulated rubber tire. Fig. 20 is a view of the swivel used in diminishing or increasing the length of a supporting-cable. Fig. 21 is an elevation, and Fig. 22 a plan, of the crab for moving the car along the suspension-cables. Figs. 23 and 24 are perspective views illustrating manners of connecting crossing lines. Fig. 25 is an enlarged section at 25 25, Fig. 24. Fig. 26 is an enlarged view, partly in section and partly in elevation, showing a manner of connecting the main and auxiliary lines at the intersection.

The towers A are shown at the intersection of streets B, and consisting of four posts, a, set with a slant toward the center, and connected with each other by horizontal members C at distances vertically of twenty to thirty feet, so as to form three, four, five, or more stories, the heighth of the topmost story varying according to circumstances. In the first story above the ground arched ribs D serve as bracing. In the upper stories a full system, E, of diagonal bracing, both horizontal and vertical, is used. The portion of each post below the street-level is embedded in a mass of masonry or concrete. (See F, Figs. 1 and 3.)

The posts may be constructed to answer as stand-pipes for fire purposes, or for the support of stand-pipes, and for the support of arc-lights, which may be placed above the second story and at the intersection of center lines of two intersecting streets. The towers I propose to construct of sufficient strength to bear the strain of the suspension-cables and their load, even when the strain is in one direction only, so that the total destruction of one tower would not involve the fall of another. Such towers could hardly be said to obstruct the view, when it is considered that the two columns next above the street-surface, say eight inches in diameter up to a height of about thirty feet, occupy only about one-fortieth of the width of a sixty-foot street, while every tower relieves the street (for the distance of a block in each direction) of many lamp-posts and telegraph-poles.

Two or more suspension-cables, G, are to be used for supporting the wires and cables H at such short distances apart that they can be pulled taut without straining them to any injurious extent, thus preventing the wires from being swayed by the wind and being brought in contact with each other, and enabling them to stand the casual strains to which they may be exposed from high winds, snow, and sleet.

The suspension-cables may be made in any suitable manner. I propose to make them of the best steel wire, protected against mechanical injury by being wound with wire, and against atmospheric influences by an outside cover or tarred marline or other suitable material. At distances of, say, twenty-five feet, the suspension-cables have attached to them transverse cross-beams I, of iron. According to the number and weight of conducting wires and cables to be carried, two, three, four, five, or more suspension-cables are to be used on the different lines.

The lines may be divided into five or more different classes. I call lines provided with five or more suspension-cables "lines of the first class." Probably very few of this class will be required. Lines of the second class are to have three suspension-cables, those of the third class two cables and spans of ordinary length. A fourth class has also two suspension-cables, but spans of double the usual length, (either temporarily or permanently.) Finally, there is to be a fifth class, having two suspension-cables crossing lines of the other classes.

All the suspension-cables are made, in the first place, ample in strength to stand any strains to which they may ultimately be subjected, and are so placed when first laid that the fastenings to towers need not at any time be changed, the construction being so devised that a line of the fourth class may be gradually changed into a line of the third, second, and first class without removing any part of the structure, but merely adding new parts. To make this method of change clear, I will describe, first, a line of the fourth class and next the method of change.

Line of the fourth class: The towers and the two suspension-cables are made of the dimensions which will ultimately be required when the line has been changed to one of the first class; but every alternate tower ultimately required is left unbuilt. The span, therefore, would be double the length of the ultimate span—say twelve hundred to fourteen hundred feet. Each length of the suspension-cable extending from tower to tower consists of two sections, one end of each section being rigidly attached to a tower and the contiguous and lower ends of the sections being attached to a tension member, J, having a swivel, J', by which the cable may be shortened when the intermediate tower is built and the cable placed upon it. The governing principle is that the suspension-cables should not, under the load which they carry before the intermediate tower is built, be exposed to any greater strain than they would have to stand when the line has been changed to one of the first class. The shortening of the bar under this condition can be easily calculated.

The two suspension-cables are connected by the cross-beams I, as before described, and on these cross-beams conducting cables and wires H rest. In the middle of the cross-beam one or two rollers, K, are attached to carry the rope or ropes L, by means of which the car, hereinafter to be described, is to be moved. At the same point below the cross-beam a short post, M, is fixed, carrying a cross-bracket, N, with cups O. Every wire H' for house-connection, when taken from its place on the cross-beam, is first to be carried to one of the cups O, and there fastened before being carried to the house. Small conducting-cables of not more than twenty-five wires each should be used, so that the single wires when used will find room on one half the cross-beam, the other half to be reserved for other cables and wires. The wires for connecting with the houses would be rather slack. The electric light may be suspended from the cross-bar in the middle of the span.

When the capacity is to be increased, the line of the fourth class is changed into one of the third class. The intermediate towers are built and the suspension and conducting cables and wires raised as the tower is built up. In raising the tower no horizontal strain is brought upon it, as the strains caused by the cable on each side balance each other. It is therefore only necessary to raise the central bars vertically, and at the same time increase the distance between the ends of the cables by means of the swivel. When the intermediate tower has been erected, the line is able to carry a greater load, as the spans are only half as great, but its capacity for single wires has not been increased. If it becomes desirable to have more room for the single wires, the third-class line can be changed into one of the second class by adding a third suspension-cable, P, of smaller diameter than the two others. This is suspended about eight feet lower than the two upper cables, and is stretched to the same versed sine. To the ends of each cross-beam inclined bars Q are fastened, which, with the cross-beam, form triangular frames, to which short horizontal brackets R are fixed, which are to carry the single wires. The third suspension-cable P is held in position against lateral motion by passing through an open slot or fork, S, fastened to the bottom of the triangular frame. The single telegraph and telephone wires may be disposed on the brackets, so as to leave the whole upper cross-beam free for the accommodation of cables and electric-light wires. In case, in the course of time, this second-class line has not sufficient room for cables, its capacity is increased by the addition of two suspension-cables of somewhat smaller diameter than the two upper cables, these additional cables P' P' stretched directly below the upper suspension-cables, but a little higher than the central suspension-cable, P. The two new cables are not connected with the upper suspension-cables; but they are connected with each other by cross-beams T at the same distance apart as those upon the upper cables. The lower tier of cross-beams is preferably placed staggering with the upper set. A fork, U, is fixed to the center of the lower cross-beams, T, and its prongs loosely embrace the lower suspension-cable, P, so as to allow vertical motion of that cable relatively to the cross-beams, but to enforce a uniform lateral motion of cross-beams and cable.

Auxiliary lines are to be used on streets crossing the main line when but few houses are to be supplied. They are to consist of two very light suspension-cables, $P^2$, fastened to the towers and connected at their centers with the lowest point of the lower suspension-cable, P, of the main line by a fork, allowing vertical motion, as shown, in the same manner as the cross-bar T is connected with this cable. (See Fig. 10.) Thus the suspension-cables $P^2$ of the auxiliary lines pass under the cable P, and by means of the fork act as guys to the main line.

To arrange for the laying, repairing, and removing of cables and wires, cars V are provided—one for each span—which run upon the upper suspension-cables, and which carry the workmen. In the case of the auxiliary lines which cross the main lines, two cars are provided for each span, as the car can travel only from a tower to the main line. The fourth-class lines may also be provided with two cars to each span, as each span may ultimately be divided into two spans. The cars for the fourth and third class lines are the same, and also those for the second and first class.

In cases where the fourth and third class lines are ultimately to be changed to lines of the second or first class, the cars when first placed are so arranged that by merely adding suspended platforms the same cars may be used.

The cars, when not in use, remain fastened to the towers. They are moved either by an endless rope, W, passing over sheaves upon the towers and fastened to the car, so that they can be moved by workmen upon the towers; or a rope may have its ends attached to the towers at the ends of the span and pass around a drum under the under side or other part of the car, so that a workman standing upon the car, or a platform suspended thereon, may turn the drum by a crank or other suitable appliance.

In Figs. 21 and 22 is shown a crab, which is supposed to be attached to one of the towers, and having a drum, X, on which the endless rope is coiled. The drum is turned by a hand-crank, Y, with suitable intermediate gearing, Z.

The car for the first and second class lines has four wheels made with a deep flange, V', upon the outside, to prevent the wheels escaping from the cables G, while said cables are held at the proper distance asunder by the connecting-bars I, already referred to. The wheels have a rubber tire, $V^2$, to insulate the car from the suspension-cables, so that the workmen may be insulated and will not be subjected to a shock on touching a charged conductor. The bearing part of the pulleys is made sufficiently wide to prevent any possibility of the wheels leaving the cables upon the inner side of the wheels. The axles $V^3$ have journal-bearing in housings $V^4$, which are made of the form of an inverted U, and which are fixed to stringers $V^5$, that are fastened to a cross-beam, $V^6$, by which latter the housings $V^4$ are connected and held at the proper distance asunder. To this cross-beam are fastened stringers, to which the platform or floor of the car V is attached. The housings $V^4$ are preferably insulated from the car-body, to insure the perfect insulation of the workmen, for the purpose set forth. Around the axles on the outer sides of the wheels are sleeves $a'$, from which descend hangers $b$, to which are attached hanging platforms $c$, for the accommodation of workmen in the laying or repairing of the conducting cables and wires.

If cars for the third or fourth class lines are to be ultimately intended for second and first class lines the suspended platforms are at first left off. When a third or fourth class line is not to be changed to a second or first class, the cars of the same construction are used for the suspension of platforms from the axles of the car. It will be seen that as the house-lines are carried downward for connection with the houses they will not interfere with the movements of the car.

In Fig. 23, taken in connection with the plan in Fig. 4, the preferred arrangement of the cars for the main and auxiliary lines is illustrated, the towers being placed at each intermediate corner of each street in such position that the lines cross each other at the center between the towers. Thus the same towers may be used for the main lines and the auxiliary lines. I have described a connection being made by a fork on the auxiliary line embracing the cable P of the main line. In Fig. 26 is shown a yoke permitting the vertical movement of the cables respectively to each other, but enabling the auxiliary-line cable to act as a guy for the main-line cable.

In Figs. 24 and 25 the cross-beams of the two lines are shown connected by a bolt, d, passing through both.

I claim as my invention—

1. The combination, with the suspension-cables, of the cross-beams supported thereby, and the insulators for the attachment of the electrical conductors, substantially as set forth.

2. The combination, with the suspension-cables, of the rigid cross-beams supported thereby and having the insulators for the attachment of the electrical conductors, substantially as set forth.

3. The combination, with the supporting-towers and two parallel suspension-cables, of the rigid cross-beams secured at short intervals to said cables, and the insulators secured to said cross bars or trees, substantially as set forth.

4. In a system for supporting and repairing electrical conductors, the combination of a number of towers placed at suitable distances apart, a pair of parallel suspension-cables supported by said towers, a rigid truck-frame, and wheels journaled therein and running upon said cables, substantially as set forth.

5. In a system for supporting and repairing electrical conductors, the combination of a number of towers placed at suitable distances apart, a pair of parallel suspension-cables supported by said towers, and a number of trucks each having upon its opposite sides wheels running upon the respective suspension-cables, one of said trucks being provided between each two adjacent towers, substantially as set forth.

6. The combination, with the towers and the parallel suspension-cables, of rigid beams connecting said cables and holding them at the proper distances asunder, and a truck having wheels running upon said suspension-cables, and rigid connection between the wheels upon the opposite sides of the truck for holding them at the proper distance asunder, substantially as set forth.

7. The combination of the parallel suspension-cables, a truck having wheels running upon said cables, and rigid connection between the wheels upon the opposite sides of the truck for holding them at a distance apart equal to the distance between the cables, rigid beams connected to said cables and holding them at the proper distance asunder, a cable or rope attached to said truck for drawing it, and sheaves journaled upon said rigid cross-beams for supporting said traction-cable, substantially as set forth.

8. The combination, with a pair of suspension-cables placed side by side and cross-beams connecting them and holding them parallel, of a truck having wheels upon its opposite sides running upon the respective suspension-cables, and a platform, substantially as set forth.

9. The combination, with the suspension-cables and bars or brackets projecting downwardly therefrom, to which the electrical conductors are secured, of a truck running upon said suspension-cables and having a depending platform, substantially as set forth.

10. The combination, with the suspension-cables G, the rigid beams I, connecting them, and the downwardly-projecting bars or brackets Q, of the rigid truck-frame, the wheels journaled therein and running upon said cables, the superposed platform, and the depending platform, all constructed and arranged substantially as set forth.

11. The combination, with the suspension-cables, the beams for holding them apart, and means for supporting the electrical conductors in a plane below said suspension-cables, of the rigid truck-frame having four supporting-wheels resting upon said cables, a pair of hangers depending from each side of the platform, (one at each end,) and a platform supported by each pair of hangers, substantially as set forth.

12. The combination of two suspension-cables connected by beams, to which the conducting wires or cables are connected, and brackets depending from said bars, to which the house-wires are connected between the cross-beam and the house.

13. The combination of two suspension-cables, cross-beams connecting these cables, a third suspension cable at a lower level, and inclined bars connecting the cross-beams to the third cable.

14. The combination of two suspension-cables, parallel and at equal elevation, cross-beams connecting these cables, inclined bars connecting the cross-beams with a suspension-cable beneath, and brackets attached to the inclined bars for the support of conducting-wires.

15. The combination of elevated towers, suspension-cables supported on the towers, cross-beams connecting the cables, inclined bars connecting the cross-beams with a suspension-cable at a lower level, the said lower suspension-cable, and a pendent bracket for the attachment of the house-wires, substantially as and for the purpose set forth.

16. The combination of two suspension-cables at the same level and parallel with each other, cross-beams connecting these cables, a central suspension-cable at a lower level connected to the cross-beams by inclined bars, and two suspension-cables of about the same level as the central cable, connected together by cross-beams having yokes or forks embracing said central cable, substantially as and for the purpose set forth.

17. The combination, with intersecting lines of electrical conductors, of a suspension-cable for each, said suspension-cables being connected for affording mutual support against lateral motion, substantially as set forth.

18. The combination, with intersecting lines of electrical conductors, of suspension-cables and a clip secured to one and having an elongated eye for embracing the other of said suspension-cables, substantially as set forth.

19. The combination of a plurality of suspension-cables, and beams for holding said cables at the proper distances asunder and supporting the conductors, substantially as set forth.

20. The combination of suspension-cables supported one above the other, connections Q between said cables, and cross-trees or brackets secured to said connections for the attachment of the conductors, substantially as set forth.

HENRY FLAD.

Witnesses:
SAML. KNIGHT,
EDW. S. KNIGHT.